United States Patent [19]

Paul et al.

[11] Patent Number: 5,677,602
[45] Date of Patent: Oct. 14, 1997

[54] HIGH EFFICIENCY ELECTRONIC BALLAST FOR HIGH INTENSITY DISCHARGE LAMPS

[76] Inventors: Jon D. Paul, 42 Truman Dr., Novato, Calif. 94947; Richard Redl, Derrey-La-Cabuche, CH-1756 Onnens, Switzerland

[21] Appl. No.: 451,123

[22] Filed: May 26, 1995

[51] Int. Cl.$^6$ ............................................. H05B 37/02
[52] U.S. Cl. .................... 315/224; 315/307; 315/244
[58] Field of Search ............................... 315/307, 308, 315/244, 82, 224, 247

[56] References Cited

U.S. PATENT DOCUMENTS

| | | | |
|---|---|---|---|
| 4,904,905 | 2/1990 | Olon | 315/307 |
| 5,083,065 | 1/1992 | Sakata et al. | 315/82 |
| 5,212,428 | 5/1993 | Sasaki et al. | 315/82 |
| 5,319,284 | 6/1994 | Lee | 315/307 |
| 5,355,055 | 10/1994 | Tary | 315/307 |
| 5,382,882 | 1/1995 | Nerone | 315/307 |
| 5,434,477 | 7/1995 | Crouse et al. | 315/209 R |

*Primary Examiner*—Robert Pascal
*Assistant Examiner*—Michael Shingleton

[57] ABSTRACT

An electronic ballast is powered by power source (102) and (104). The ballast controls the electrical power supplied to a gas discharge lamp (116), providing the voltages and currents required to start, warm-up and operate the lamp (116). Line power conditioner (100) reduces interference and harmonic generation, and provides a source of DC power (103), which may be regulated. DC power (103) is applied to inverter (105), which generates a square-wave voltage at a variable frequency determined by control circuit (200). Inverter (105) output is connected to resonant circuit (600) consisting of series inductor (110), series capacitors (112) and (118), and parallel inductor (114), across which gas discharge lamp (116) is connected. Operation begins with inverter (105) running at a frequency initially near but above the unloaded series resonance frequency of resonant circuit (600). Controller (200) reduces the frequency until resonant circuit (600) gives sufficient voltage to start lamp (116). After lamp (116) starts, controller (200) increases inverter (105) frequency to an intermediate frequency near but above one-third of the resonance of the series inductor (110) and the capacitors (112) and (118 causing a high current to flow in lamp (116), for warm-up. After a warm-up interval, controller (200) further increases inverter (105) frequency to a final value which is also above the frequency of acoustic arc resonance and above the loaded resonance frequency of resonant circuit (600).

9 Claims, 8 Drawing Sheets

Inverter output voltage [50 V/div.]     Fig. 7 (a)     t [2us/div.]

Inverter output current [0.4A/div.]   Voltage across non-ignited lamp [80V/div.]   t [2us/div.]
Fig. 7 (b)

Inverter output voltage [50 V/div.]     Fig. 7 (c)     t [2us/div.]

Inverter output current [1A/div.]   Voltage across non-ignited lamp [1kV/div.]   t [2us/div.]
Fig. 7 (d)

Inverter output voltage [50V/div.]   Fig. 8 (a)   t [2us/div.]

Inverter output current [0.4A/div.]   Fig. 8 (b)   t [2us/div.]

Inverter output voltage [50V/div.]   Fig. 8 (c)   t [2us/div.]

Inverter output current [0.4A/div.]   Fig. 8 (d)   t [2us/div.]

HIGH EFFICIENCY ELECTRONIC BALLAST FOR HIGH INTENSITY DISCHARGE LAMPS

BACKGROUND—FIELD OF THE INVENTION

This invention relates to lamp ballasts, particularly to electronic ballasts which employ semiconductors to provide power conditioning and interfacing for starting and operating gas discharge lamps such as metal halide lamps.

BACKGROUND—DESCRIPTION OF PRIOR ART

Gas discharge lamps operating at high intensity and metal halide lamps in particular provide high efficiency lighting with controlled color. These lamps require a high voltage to initiate a discharge and a ballast which limits the current after the lamp starts. Transformers and inductors operating from an alternating current (AC) power line have been used to provide this function. Magnetic ballasts are inexpensive and simple, but have many drawbacks. They are large and heavy since they are made out of iron and copper. They require substantial power factor correction capacitors to provide a high power factor. They require separate high voltage ignitors to start the lamp. Magnetic ballasts generally operate their iron cores near saturation for part of the power line cycle. This reduces efficiency and increases heat dissipation. These ballasts have little provision for control of lamp power or compensation of varying power line voltage. The size and weight of magnetic ballasts prevents their use in small ceiling-mounted fixtures, such as track lights.

Electronic ballasts provide smaller size, lighter weight, and regulated operation for these lamps. They provide increased efficiency over the magnetic ballasts and are capable of relating lamp power. Electronic ballasts for high intensity discharge (HID) lamps are a relatively recent development and have been limited in their commercial introduction because of a number of difficulties and drawbacks. HID lamps include metal halide, high pressure sodium, and mercury Imps. These lamps have starting voltages from 500 V to 25 kV or more. A ballast open circuit voltage of 200–300 V is required for sustaining the arc. Just after starting, all of these lamps have a very low arc voltage, e.g. 17 V, and consequently require a high current to generate sufficient power to warm-up the arc tube to a final steady-state temperature. A further characteristic of these lamps is the tendency for the arc to wander and become unstable when operated on a current of high frequency, e.g. 5–200 kHz, as might be generated by a switching power inverter. This phenomenon is sometimes called "acoustic arc resonance," and is a completely different phenomenon from the resonance in a tuned circuit.

Electronic ballasts for fluorescent lamps are commonly available and work by generating a high frequency sinewave using an inverter circuit. These are not suitable for operation of HID lamps because of the characteristics mentioned above. A substantial number of electronic ballasts have attempted to solve these problems by using techniques such as generation of a low-frequency square wave or operation at high frequency within a narrow "window" where there is no acoustic arc resonance. Other techniques require a special lamp construction or a lamp and ballast which are specifically designed to interface with each other. This limits their application to these particular types of lamps.

Economic success of HID electronic ballasts has not been widely achieved due to high cost of parts, poor efficiency, lack of reliability and acoustic arc resonance.

Numerous attempts have been made to operate HID lamps at increasingly higher frequencies to reduce cost, size, and weight. All previous electronic ballasts operate at frequencies below the highest frequency of acoustic arc resonance. Various methods of preventing that resonance have not proved reliable in practice. High frequency ballast designs have suffered from arc resonance in the lamp at frequencies as high as 300 kHz and from overheating of the transistors due to switching losses at these high frequencies.

Certain ballast topologies require the power flowing to the lamp to be processed by several stages in cascade which results in a substantial increase in cost, power loss, increase in waste heat, and reduced reliability.

A particular advantage of electronic ballasts in general is their small size and weight. Compact fixture designs use this to advantage by locating the ballast near the lamp. The ballast components self-heat. The lamp heat further increases the ballast temperature. For each 10 degrees C of temperature increase, the life of the ballast components is reduced by 50%. When combined with losses due to multiple power processing and high frequency switching, the reliability of the ballast is seriously reduced.

Electronic ballasts must operate in the presence of high voltage transients present on the incoming power line, and those generated by the high voltage starter as well as from external sources such as lightning. The semiconductors within the ballast are susceptible to these sources of high voltage. The electrical wiring of the ballast may get short-circuited to ground or across the output of the ballast or can be connected improperly at the input. Any of these faults may result in destruction of the ballast circuitry. Most of the existing ballasts require a different connection for 120 V or 240 V power lines. Portable equipment or ballasts used in locations with several different voltages installed may result in improper voltages applied to the ballasts. The high voltages used for open circuit and starting the lamp appear at the lamp socket and present a hazard to the user.

Metal halide lamps have a very high voltage drop immediately after starting, often exceeding 300 V. The open circuit voltage of the ballast during starting must overcome this high arc drop and provide sufficient current to effect a transition from glow to arc mode. The electrodes of the lamp must receive sufficient current to be heated to incandescence, thus creating a stable arc. Many previous ballasts did not provide sufficiently high, open-circuit voltage or sufficient arc current from the ballast in the transition interval just after starting to ensure reliable lamp operation. In particular, lamps near the end of life are more difficult to start.

The gas filling pressure of the lamp increases with temperature as the lamp warms up. This causes a great increase in the starting voltage required, should a hot lamp be momentarialy extingusihed due to an interruption in power. Many applications, for example movie lighting, safety lighting, etc. require a fast restart. The cooldown period of most lamps is 20–90 seconds. While hot, the starting voltage rises to 10kV–55kV in large metal halide lamps. The existing ballasts require separate special starters to develop this voltage. This is known as a "hot-restrike" capability. In previous ballasts, there is no provision to easily hot-restrike the lamp.

In the 20 year period since their introduction in 1975, the only commercially viable production metal halide electronic ballasts have been in the area of studio, medical and photographic lighting. High volume, lower cost general illumination markets cannot afford these expensive devices and have continued to use the conventional magnetic ballasts.

BACKGROUND—DESCRIPTION OF PRIOR ART—PATENTS

U.S. Pat. No. 3,969,652—Herzog, Jul. 13, 1976, uses a step-down converter driving a full-wave bridge to generate a low-frequency square-wave to the lamp. This requires two power-processing units in cascade.

U.S. Pat. No. 4,004,188—Cooper, Jan. 18, 1977, discloses a similar arrangement and adds a pulse starter. This also generates a low-frequency square-wave.

U.S. Pat. No. 4,240,009—Paul (co-inventor), Dec. 16, 1980, shows a transformer-coupled, regulated inverter driving a constant current into a full-wave bridge. A watt-meter circuit operates from the Direct Current (DC) power into the regulated inverter.

U.S. Pat. No. 4,277,728—Stevens, Jul. 7, 1981, shows a switching regulator with power factor correction, driving an inverter whose output operates a fluorescent lamp through a resonant network comprised of series inductors and a shunt capacitor. The inverter generates a sine-wave of typically 30 kHz.

U.S. Pat. No. 5,001,400—Nilssen, May 19, 1991, uses a half-bridge inverter and series inductor to operate a fluorescent lamp. It incorporates power factor correction by combining the lower bridge transistor with an inductor and a diode to provide power-factor correction using the same transistor that is in the lower half of the inverter.

U.S. Pat. No. 5,371,440—Liu et al., Dec. 6, 1994, uses a power-factor corrector connected to a high frequency inverter to produce a 1–2 MHz output which is modulated by 20 kHz. This is subsequently demodulated and finally chopped with a commutator. This allows the use of high frequency magnetics to generate a lower frequency lamp current to reduce interference.

U.S. Pat. No. 5,381,076—Nerone, Jan. 10, 1995, uses a power factor corrector to operate a half-bridge inverter which is connected to a resonant circuit consisting of a series inductor and parallel capacitor. This generates a high voltage to start the lamp and then shifts inverter frequency to control the operating current of the lamp.

All of these techniques have numerous disadvantages when applied to low-cost efficient HID ballasts. The disadvantages include one or more of the following: poor efficiency due to several stages of power processing, inability to operate at frequencies sufficiently high as to prevent acoustic arc resonance, use of a separate pulse ignitor, high cost, and/or highly complex power processing. Many of the circuits described in the cited patents are unsuitable for commercial products manufactured in high volume and low cost due the their complexity. Techniques incorporating a low frequency full-wave bridge require at least five active devices. The ballasts which generate high frequency sinewaves are incapable of preventing acoustic arc resonance and may also suffer from poor efficiency due to switching losses. The multiple power processing in most of these prior designs incorporate 2 or 3 transistors active and in series at any instant of time. That causes poor efficiency, decreased reliability, and high cost.

Many of these topics are further described in two papers by co-inventor Paul, "The Electronic Ballast," Power Conversion International 1981 Proceedings, pp. 467–484 and "Reliability Aspects of Electronic Ballasts," Power Conversion International September 1983 Proceedings, pp. 187–198.

BACKGROUND—OBJECTIVES OF THE INVENTION

Accordingly, it is an object of the present invention to provide an improved electronic ballast which starts and operates metal halide and other types of high intensity gas discharge lamps, to provide such a ballast at a lower cost, and to provide such a ballast which is small and lightweight.

It is a further object to provide such a ballast which prevents acoustic arc resonance in the lamp, and to provide such a ballast which has a high open circuit voltage to the lamp during the glow to arc transition.

It is a further object to provide such a ballast which has a high power factor, and to provide such a ballast which has a high efficiency.

It is a further object to provide such a ballast which is highly reliable, which will not be damaged by wiring faults such as short or open circuits, and which will reduce the possibility of electric shock if the output terminals of the ballast are accidentally touched.

It is a further object to provide such a ballast in an arrangement which uses simple control of the lamp power.

It is another object of the present invention to provide a gas discharge lamp ballast which can operate from a wide range of input voltages automatically, and to provide such a ballast which operates a wide variety of lamps without adjustment or modification.

It is a further object to provide such a ballast which has a compact, simple and low cost starter for hot restart of metal halide lamps.

BRIEF DESCRIPTION OF THE DRAWINGS

FIGS. 5a and b is a plot of FIG. 1 resonant circuit voltage and current gain versus frequency with lamp impedance as a parameter showing the locus of starting, warm-up and operation.

GENERAL PRINCIPLES OF THE INVENTION

For the above reasons, we have developed an electronic ballast which can be connected between a power source and a gas discharge lamp to start and operate the gas discharge lamp. The electronic ballast described herein uses a variable frequency inverter, a double resonant network and a feedback control system to provide high voltage starting, transition from glow to arc mode, high current after starting for rapid warm-up and constant-power steady-state operation. Arc resonance is avoided by operation a high frequencies and efficiency is maximized by using soft-switching in all phases of operation.

The power source is connected to a input power conditioner which may include any or all of the following elements so as to buffer and filter, rectify and convert the source of incoming power to a source of filtered DC voltage of typically 350 to 400 V. The configuration of power conditioning circuitry depends on the incoming power source. The preferred embodiment for AC power line input uses an EMI filter connected to a full-wave rectifier. The EMI filter reduces high frequency interference generated in the ballast circuitry. The rectifier changes incoming AC to full-wave pulsating DC. The pulsating DC is applied to a boost power factor corrector whose functions are (1) to change the shape of current drawn from the power source so as to achieve a power factor near unity and (2) to provide a regulated DC voltage of typically 350 to 400 V for the ballast. These circuits are well known in the industry and are required for regulatory compliance. The operation of the power factor corrector provides an additional benefit of a filtered, regulated output voltage for any power line voltage between a wide range of values, for example 80–240 VAC. Another implementation includes a voltage doubler rectifier to operate from 120 V power where active power factor correction and DC source regulation is not required. Yet another variation is to employ passive power factor correction.

The DC output of the power factor corrector is applied to an inverter which changes the DC into a high frequency square-wave of AC. Many different configurations are possible including half-bridge, full-bridge and others. Typically, metal oxide semiconductor field effect transistors (MOSFET) would be used in the inverter, although other types of semiconductor switching devices can also be employed. The inverter is capable of operating over a wide range of frequencies, e.g. 80 kHz to 500 kHz. The inverter output transitions from zero to the DC bus voltage, e.g. 350 V in each cycle. The output of the inverter is connected to a resonant circuit of a design which, depending on the lamp resistance, exhibits two different resonant frequencies. The preferred construction uses a first inductor attached to the inverter output, a capacitor in series with the first inductor, and a second inductor from the capacitor to the inverter and power source common return. The lamp is connected across the second inductor. The second inductor has an inductance approximately 10–20 times higher than the first inductor. Depending on the lamp impedance, two resonant frequencies exist in the response of this network. When the lamp resistance is high (that is the lamp is not ignited), the two inductors and the capacitor define a first frequency resonant (also called "unloaded resonant frequency"). When the lamp resistance is low (that is, the lamp was ignited and operates with low voltage drop), the second inductor is essentially shorted out and the first inductor and the capacitor define a second, higher, resonant frequency (also called "loaded resonant frequency"). By varying the frequency of the inverter, the voltage across the lamp and the current flowing through the lamp array be varied over a wide range.

The status of the lamp changes during the several stages of its operation. These changes are sensed by detecting the lamp voltage and/or lamp current and using signals which are analogs of these values in a feedback system. A control circuit receives a current signal and/or a voltage signal and changes the frequency of a variable frequency oscillator in response to changes in the signals and predetermined timing sequences. The output of the controller is connected to a driver which amplifies and level shifts the output of the controller. The driver also provides two output signals with approximately 180-degree phase difference. The two outputs of the driver operate the inverter transistors.

Inverters may operate with hard-switching or soft-switching. Hard-switching means that a transistor is turned on when substantial voltage is present across its output terminals. The capacitance between those terminals (either parasitic or intentionally placed for snubbing purposes) is then discharged and causes switching loss. Although at low frequencies (up to about 50 kHz the switching loss caused by hard-switching is usually acceptable, at the high frequencies required to avoid acoustic arc resonance in small HID lamps, that loss can be very significant. The loss is even higher if the switch turns off a conducting diode connected directly to its output as is often the case in half-bridge or full-bridge inverter topologies.

When a power transistor operates in soft-switching, the voltage across it is essentially zero at turn on. The result is a dramatic reduction in turn-on loss. Soft-switching which is sometimes called Zero Voltage Switching (ZVS) or Transition Resonance is a natural way of achieving high efficiency at high frequencies.

The inverter of the present invention operates in soft-switching mode. The soft-switching technique requires that the load presented to the inverter is of such a nature that at turn-on the current in the switch is negative and at turn off it is positive. Such a load usually has a lagging phase angle at the switching frequency, that is the load is inductive. An alternative way of achieving soft-switching is to have a resonant load in which the current swings back and forth several times during the conduction period of the switch, and is interrupted by the switch when the switch current is positive. We call this type of operation "Subharmonic Soft-switching." Soft-switching also requires that the switch be able to conduct current in both directions. In MOSFET devices the body diode provides a path for negative current when the transistor is turned off. If another type of switch is used without an internal diode, for example, a bipolar junction transistor or an IGBT, then an anti-parallel diode would be added across each of the switches in the inverter.

The lamp presents a very wide range of load impedance to the ballast circuit. Prior to starting, the lamp is an open circuit. A high voltage must be generated to break down the gas in the lamp. After starting, the lamp has a very low voltage, approximately 17 V. As the lamp warms up, the gas pressure and temperature increase over a period of many seconds until the arc elements are fully ionized. During this warm-up interval, the voltage of the lamp is rising until a final value of 70 to 120 V is attained. Rapid warm-up of the lamp requires a higher current during warm-up than the steady-state operating current of the lamp, usually a 50% increase.

The ballast provides the necessary voltages and currents for each of these lamp conditions during the starting and warm-up cycle. Initially, the frequency of operation is set at a frequency that is above the lower resonant frequency and, preferably, slightly above one-third of the upper resonant frequency. This defines an idle frequency. The advantage of setting the idle frequency slightly above one-third of the upper resonant frequency is that after the lamp has started and becomes a low impedance, subharmonic soft-switching is automatically achieved when the controller resets the frequency of the inverter to the idle frequency during the warm-up period. By having the same frequency for idling operation and warm-up, the control circuit can be simplified.

At start, the output voltage of the inverter (and also the voltage across the lamp) is increased by decreasing the inverter frequency from the idle frequency (e.g. 125 kHz) towards the lower resonant frequency (e.g. 80 kHz). The voltage increase is caused by the resonant action of the series capacitor and the sum of the series and parallel inductors.

Lamp voltages of 1 to 5 kV are easily achieved for starting the lamp. When the lamp starts, the current or voltage sensors detect the increase in lamp current and/or the decrease in lamp voltage and the control circuit immediately increases the inverter frequency to a higher warm-up value. For the reason discussed above, the warm-up frequency is chosen to be the same as the idle frequency (that is slightly above ⅓ the second resonant frequency of typically 313 kHz; for example 125 kHz) or slightly above the second resonant frequency. In ether case soft-switching is maintained. By adjusting this frequency the lamp current during warm-up may be set to any desirable value, e.g. 50% above steady-state operating current.

After a suitable time delay, or when the lamp voltage has increased to a value indicating complete warm-up, the control circuit increases the inverter frequency further to a final operating value, e.g. 500 kHz. This final frequency is chosen to be above the highest frequency of acoustic arc resonance or the second resonant frequency of the inverter load network, whichever is higher. As previously mentioned, the arc may become unstable, fluctuate or extinguish at lower frequencies. Operation above the highest acoustic arc resonance frequency prevents this undesirable problem. The double resonant network enables control of lamp voltage during starting and lamp current during warm-up and operation. It also ensures soft-switching during all modes of operation by properly selecting the operating frequency for each mode of operation.

The electronic ballast described uses a variable frequency inverter, a double resonant network and a feedback control system to provide high voltage starting, transition from glow to arc mode, high current and rapid warm-up and constant wattage steady-state operation. Arc resonance is avoided by operation at high frequencies and efficiency and reliability are maximized by using soil-switching in all phases of operation.

DESCRIPTION OF SCHEMATIC OF BALLAST

Figure 1:
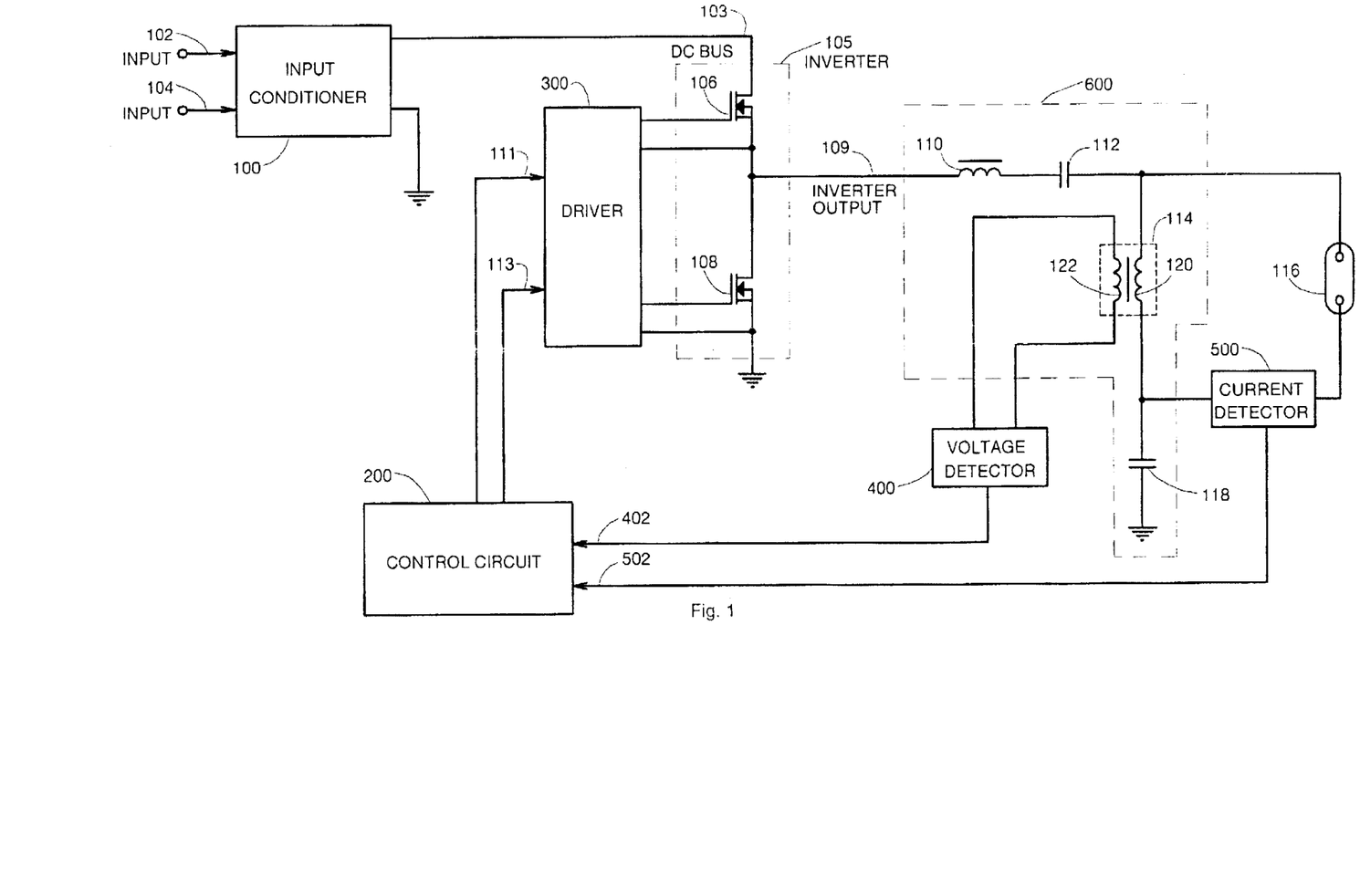
FIG. 1 is an overall block diagram schematic of a circuit according to the invention in its preferred embodiment.

FIG. 1 schematically illustrates the preferred embodiment of the ballasts in the form of an electrical circuit diagram. Power is applied to terminals 102 and 104 which are connected to an input conditioner 100. The input conditioner provides interference filtering, rectification, and power factor correction as required by the application. It may contain any or all of these items using techniques well-known in the electronics industry. The output of input conditioner 100 is a source of DC power 103 which is generally at a voltage of 100 V to 450 V, typically 350 V to 400 V. Input conditioner 100 may also provide regulation of DC source 103.

An inverter 105 is comprised of two power MOSFET transistors, 106 and 108, connected in series between DC source 103 and local ground return. These transistors include body diodes to allow passage of current in the direction opposite to their normal conduction. The MOSFETs conduct alternately under control of signals applied to their gates by a driver 300.

The voltage at output 109 of the inverter 105 alternates between DC source 103 and ground return generating a square-wave at inverter output 109 whose frequency is either the same as the frequency of the inputs 111 and 113 to driver 300, or can be divided to one-half of that frequency by a toggle flip-flop in driver 300. The driver includes amplifying and level-shilling circuitry. Optionally it can (not shown) include phase splitting circuitry and/or circuitry that inserts a small amount of dead time between the turn-off of a MOSFET and the turn-on of the other MOSFET in order to prevent overlapping conduction.

Output 109 of the inverter 105 is connected to a resonant circuit 600 consisting of series inductor 110 connected to a series capacitor 112. The output of capacitor 112 is connected to one terminal of lamp 116 and to the first winding 120 of parallel inductor 114. The other terminal of lamp 116 is connected to the second terminal of the first winding 120 of parallel inductor 114 through a current detector 500. Parallel inductor 114 and the second terminal of current detector 500 return to the ground return through a capacitor 118. Parallel inductor 114 includes a second winding 122 which is attached to a voltage detector 400. The voltage at the inverter output 109 is a square-wave of variable frequency. This square-wave is filtered and coupled to lamp 116 by resonant circuit 600.

The frequency of the inverter 105 is variable under the control of control circuit 200. This can be implemented using well known analog circuit techniques or by the use of a microprocessor operating in conjunction with analog to digital converters to generate the inverter frequency. The minimum frequency is the series resonance of capacitors 112 and 118 and inductors 110 and 114 (that is the lower, unloaded, resonance frequency of resonant circuit 600), typically 80 kHz. The maximum frequency is above the series resonance of capacitors 112 and 118 and inductor 110 (that is the higher, loaded, resonance frequency of resonant circuit 600), and the maximum frequency of acoustic arc-resonance of the lamp 116, whichever is higher. That frequency depends on the arc tube dimensions and other characteristics of the lamp. For a 50–150 W lamp, the typical steady-state operating frequency of the inverter 105 is 400–500 kHz.

By changing the frequency between these limits, the voltage and current at lamp 116 may be changed from the high voltage required for starting, to the high current needed for warm-up and then to the normal current and voltage for steady-state lamp operation.

The status of the lamp is monitored by the voltage detector 400 and current detector 500. These circuits are generally combinations of sense resistors, transformers, rectifiers, and filters which are well-known, to provide analog of the voltage and current of the lamp 116 scaled to convenient values. Preferably, a current transformer may be used in current detector 500. The high frequency AC current and voltage of lamp 116 are detected and filtered by rectifying means and capacitive means included in voltage detector 400 and current detector 500. Output 402 of the voltage detector and output 502 of the current detector serve as inputs to the control circuit 200.

Control circuit 200 generates the various frequency changes described above in response to the changes in current to and voltage across lamp 116. Control circuit 200 generates two outputs 111 and 113 connected to driver 300. The frequency of outputs 111 and 113 are varied in a sequence which is a function of several preset time delays and the state of lamp 116 as determined by the signals at the outputs of voltage detector 400 and current detector 500. Typically outputs 111 and 113 are square-waves of the same frequency, which is also the, output frequency of inverter 105, with slightly less than 50% duty ratio and an 180 degree phase shift. Alternatively, there can be only one square-wave output of typically 50% duty ratio at twice the output frequency of inverter 105. In this case the driver 300 includes a divide-by-two toggle flip-flop circuit and means to avoid overlapping conduction of inverter transistors 106 and 108.

FIG. 1—OPERATION SEQUENCE

Upon turn-on of the ballast, control circuit 200 output frequency is preset to an "idle" value, typically 125 kHz.

The frequency is decreased during an interval, typically 50 msec, and approaches the series resonant frequency of capacitors 112 and 118 and inductors 110 and 114. This generates a high starting voltage across winding 120 of parallel inductor 114 so as to ignite lamp 116. When lamp 116 starts, the output of voltage detector 400 decreases, the output of current detector 500 output increases, and the output of control circuit 200 rapidly increases output 111 frequency to a "warm-up" frequency, typically either 125 or 400 kHz. This provides high current at the output of resonant circuit 600 to lamp 116 for quick warm-up. This frequency is maintained for a time delay, typically 10 to 45 seconds. At the end of the quick warm-up interval, the frequency is again increased to a steady-state value, typically 500 kHz. This steady-state value is chosen to operate lamp 116 at the desired current, voltage, and wattage levels.

Control circuit 200 can have additional functions, such as fault detection. For example, if the lamp 116 fails to start or is removed, the control circuit 200 will not receive signals from the lamp current detector 500. After a suitable time delay with no lamp 116 current sensed, the control circuit 200 reduces the frequency to the idle frequency of 125 kHz. This ensures soft-switching and avoids excessive switching losses in the unloaded inverter 105. Alternatively, the control circuitry can turn off outputs 111 and 113 to prevent continued starting attempts.

Figure 2:
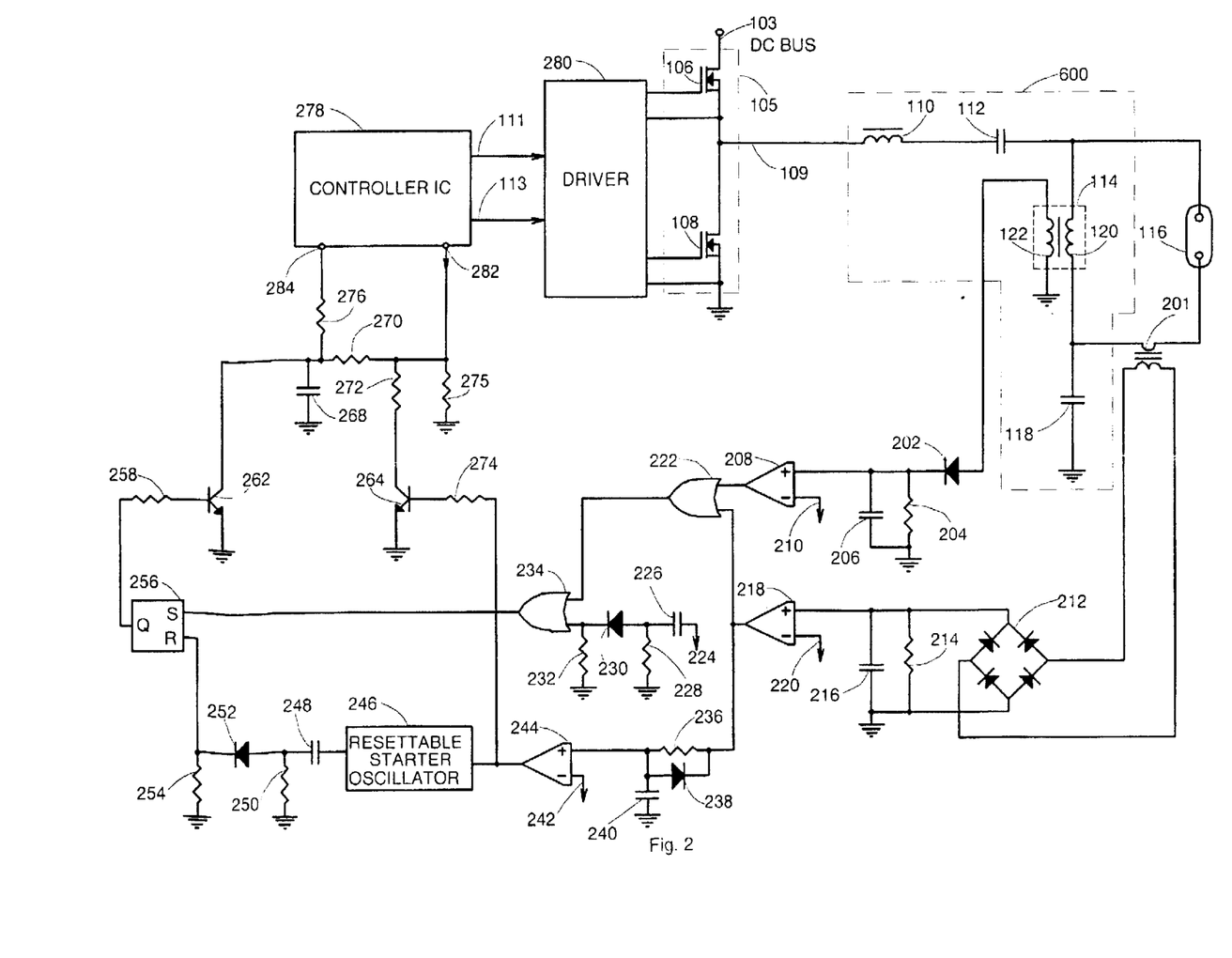
FIG. 2 shows schematic details of the voltage sense, current sense and control circuitry.

FIG. 2—CONTROL CIRCUIT DETAIL

FIG. 2 shows additional details of control circuit 200 in a typical embodiment. Lamp 116 voltage is present across winding 120 of inductor 114. An auxiliary winding 122 on inductor 114 has a turns ratio which reduces the lamp voltage substantially to a value easily processed. A turns ratio of 200:1 is typical for winding 120 to winding 122. The output of winding 122 is rectified and filtered by diode 202, capacitor 206 and resistor 204. This DC voltage output is an analog of lamp 116 voltage and is applied to comparator 208, which also receives a reference voltage 210 at its other input.

The current through lamp 116 passes through the primary winding of a current-sensing transformer 201. The secondary winding of transformer 201 provides an analog of lamp current with a typical ratio of 50:1. This current is rectified in diode bridge 212, filtered with capacitor 216 and converted into a voltage by resistor 214. Hence the voltage across capacitor 216 is an analog of lamp 116 current. This voltage is applied to the non-inverting input of comparator 218, whose inverting input is attached to a reference voltage 220. The output of comparators 208 and 218 enter an OR gate 222 which allows either signal to generate an output. The output of OR gate 222 is connected to a second OR gate 234 whose other input is connected to a power-up reset circuit comprised of power source voltage 224, capacitor 226, resistor 228, diode 230, and resistor 232. That combination generates a pulse when power is applied to the circuitry to initialize the circuit to a correct state. This is done by using the output of OR gate 234 to set an R-S flip-flop 256 to the "set" state, raising output Q.

Controller IC 278 includes a variable-frequency oscillator whose frequency is changeable in response to a current flowing out of the timing node 282. That current has a fixed component, which is determined by the fixed voltage of timing node 282 and resistor 275. An added component of current is present normally through resistor 270 as transistor 262 is held "on," when the R-S flip-flop 256 output Q supplies base current to transistor 262 through resistor 258.

This sets an initial "idle" frequency. When the R-S flip-flop 256 is "reset," transistor 262 turns off, and the current flowing out from the timing node 282 gradually decreases as the voltage across capacitor 268 increases due to the charging currents flowing in resistor 270 and the resistor 276. The other end of resistor 276 is connected to a reference voltage 284, which is usually higher than the voltage of the timing node 282. This provides the starting action of the ballast by setting the frequency initially at the "idle" frequency (e.g. 125 kHz) and gradually decreasing the frequency to a value near the unloaded resonant frequency (e.g. 80 kHz) of resonant circuit 600. The reset of R-S flip-flop 256 is periodic under the control of a low-frequency resettable starter oscillator 246 with a period of typically one second. The output of this oscillator is differentiated by capacitor 248 and resistor 250, and applied to the reset input R of R-S flip-flop 256 through a diode 252. In the absence of a reset signal, a resistor 254 pulls the reset input R of R-S flip-flop 256 to ground.

When lamp 116 starts, as indicated by an increase in lamp 116 current which is detected by the previously described current detector circuit, comparator 218 output rises to high. The high signal passes through OR gates 222 and 234 and sets the R-S flip-flop 256. The Q output of R-S flip-flop 256 goes high and turns on transistor 262 through the base resistor 258. Transistor 262 quickly discharges capacitor 268, which leads to a sudden increase of the current flowing out of timing node 282. The increase in the timing-node current leads to an increase in the frequency at the outputs 111 and 113 of the controller IC 278. Also, the frequency of the inverter output voltage 109 increases to the fast warm-up frequency of typically 125 kHz.

The high output signal of comparator 218 also enters a warm-up time-delay circuit consisting of resistor 236 and capacitor 240. Typically this delay time is set to 10–60 seconds to allow ample time for lamp 116 to warm-up. Diode 238 provides quick reset action for this long-time-delay circuit. Comparator 244 and reference signal 242 sense the voltage of capacitor 240 and provide a digital signal which turns on transistor 264 through base resistor 274 when the warm-up time delay expired. Additional current is added to the current flowing out of the timing node 282 when transistor 264 turns on at the instant the warm-up time delay expired, by connecting resistor 272 to ground which increases the frequency of controller IC 278 to the final "steady-state" value of 500 kHz.

The high output of comparator 244 disables the starting action of resettable starter oscillator 246.

Before lamp 116 started, the voltage across the parallel inductor 114 gradually increases due to the gradually decreasing output frequency of inverter 105. A fraction of that voltage is peak-detected by second winding 122 of inductor 114, diode 202, capacitor 206 and resistor 204. When lamp 116 fails to start, for example, because it is too hot, the voltage across capacitor 206 continues to increase due to decreasing inverter 105 frequency until it reaches the threshold voltage 210 of comparator 208. Output of comparator 208 rises to high and sets the R-S flip-flop 256 through OR gates 222 and 234. The Q output of R-S flip-flop 256 turns on transistor 262 through base resistor 258, which leads to an increase of the inverter 105 frequency to the idle value of 125 kHz. The R-S flip-flop stays in the set state until the resettable starter oscillator 246 resets it, leading to a new starting attempt for lamp 116. The starting attempts repeat until either lamp 116 starts or an optional timing circuit (not shown) turns off inverter 105.

Figure 3:
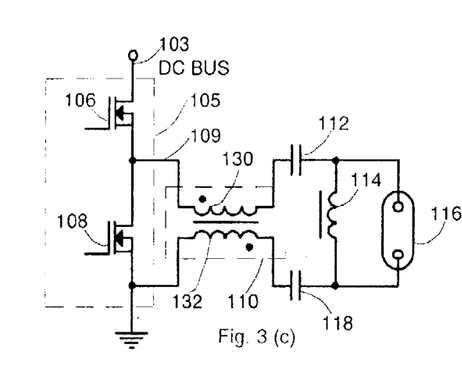
FIGS. 3a–e schematically illustrates several variations of an inverter and resonant circuit.

FIG. 3—OUTPUT CIRCUIT VARIATIONS

FIGS. 3(a) to 3(e) show a number of variations on the output circuit shown in FIG. 1.

FIG. 3(a) shows a single series capacitor 112 and eliminates second series capacitor 118. Series inductor 110 is now placed directly in series with lamp 116. This connection enables the use of special pulsed ignitors which may be combined with series inductor 110 in order to produce a still higher starting voltage. Some lamps are capable of instant restarting by use of 10–55 kV starting pulses. For this type of application, the series inductor 110 is utilized as a series injection pulse starter. The winding of the series inductor 110 has a tap winding 910 to provide a step-up autotransformer. A high voltage capacitor 930 is connected in series with a spark gap 920 which is connected to tap 910 of series inductor 110. During starting a high voltage e.g. 5 kV appears across parallel inductor 114. This voltage is rectified by high voltage diode 940 and applied to capacitor 930. The charging current is limited by resistor 950 which also sets a time constant for charging capacitor 930. When sufficient voltage is developed across capacitor 930, the spark gap 920 fires and dumps the charge of capacitor 930 into tap winding 910. This produces a high voltage pulse in series inductor 110 of several times capacitor 930 voltage. This pulse appears in series with the voltage produced normally by the ballast and serves to break down the gas filling of lamp 116 even during a hot restart. This action is repeated at a frequency determined by resistor 950 and capacitor 930, until lamp 116 starts. The inverter 105 may include additional clamp diodes or other protective circuit means to prevent the high voltage starting pulses from affecting inverter 105.

FIG. 3(b) shows the preferred connection where the capacitance is divided equally between series capacitor 112 and capacitor 118. These capacitors are relatively small in value, and provide isolation from power-line frequency currents which could flow in the event of a fault in wiring or arc to ground. This provides improved reliability and a measure of protection against electrical shock if lamp 116 terminals are touched, since power-line frequency current flow is blocked by small capacitors 112 and 118.

FIG. 3(c) changes the form of series inductor 110 by replacing its winding with two windings 130 and 132 on a common magnetic core, where winding 130 is in the path of current at the inverter 105, output 109, and winding 132 is in the return path to circuit ground. The windings of inductor 110 provide a series inductance for normal mode current which is the required inductance for circuit operation. Common mode inductance present in inductor 110 provides reduction in common-mode interference currents which would otherwise flow out of the ballast and into the wiring and lamp 116, thus reducing common mode interference.

FIG. 3(d) shows a full-bridge configuration where the resonant network 600 is connected to the output of a full-bridge comprised of four transistors 106, 108, 140, and 142. This configuration provides a higher power output than can be furnished by the half-bridge inverter configuration. Multi-kilowatt ballasts can be constructed with this technique. Driver 300 produces four outputs, with transistors 108 and 140 driven in phase as a pair, and transistors 106 and 142 driven in opposite phase.

FIG. 3(e) is a modification of the basic configuration in which the capacitance of resonant network 600 is provided by two capacitors in series, 112 and 118 connected from the DC bus 103 to circuit ground return. Capacitors 112 and 118 serve the dual functions of DC bus high frequency bypass as well as resonant capacitance.

Figure 4:
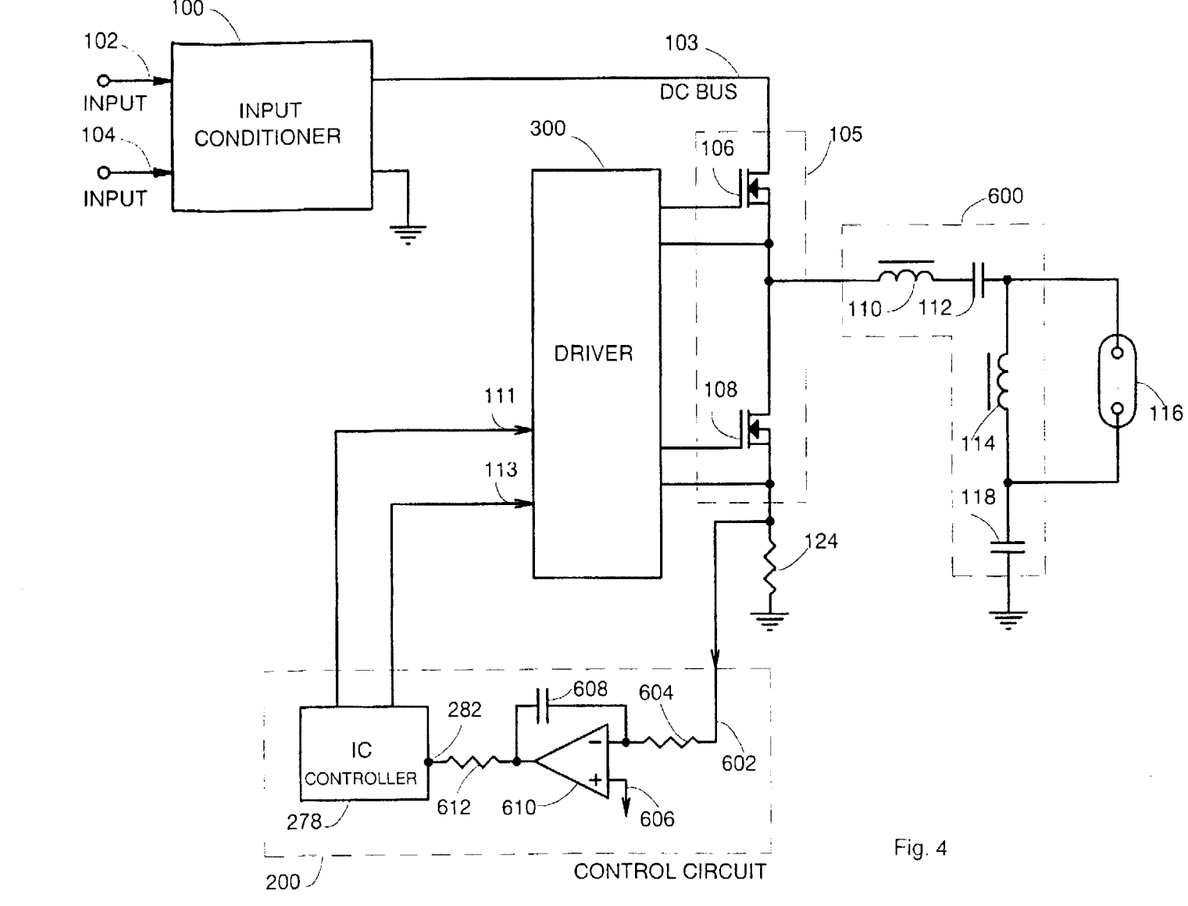
FIG. 4 schematically illustrates a preferred embodiment of wattage control added to FIG. 1.

FIG. 4—DESCRIPTION, WATTAGE CONTROL

Referring now to FIG. 4, shown is a technique for sensing lamp 116 wattage without the use of a costly high frequency multiplier circuit. Inverter 105 operates at high efficiency and dissipates a power which is negligible compared to that of lamp 116. Therefore, the average power at the DC input to inverter 105 is nearly equal to the power of operating lamp 116. A current sensing resistor 124 is connected between the source of the lower power MOSFET 108 and the ground return so as to measure current supplied to inverter 105. Input conditioner 100 must be designed to furnish a regulated DC bus 103 voltage to inverter 105; thus the average current through resistor 124 is proportional to lamp 116 wattage after the lamp 116 has started.

The voltage drop measured across resistor 124 is used as a feedback signal. This signal enters the inverting input of an operational amplifier 610 through a series resistor 604. The non-inverting input of the operational amplifier 610 is connected to a fixed voltage reference 606 representing the desired wattage. A feedback capacitor 608 provides feedback loop stabilization and averaging of the current signal obtained across resistor 124. The output of amplifier 610 through resistor 612 changes the current flowing out from the timing node 282 and thus varies the output frequency at outputs 111 and 113 of the controller IC 278 during the steady-state phase of lamp 116. The varying frequency of the control circuit outputs 111 and 113 causes a variation in the output frequency of inverter 105, which causes the lamp 116 current to change due to the action of the frequency response of resonant network 600. As known to those skilled in the art, in implementations where the DC bus 103 is not regulated, a signal proportional to the inverter 105 input power DC bus 103 voltage can be easily generated by multiplying the DC bus 103 voltage with the current signal across resistor 124. A further simplification is to use a linear approximation and subtract a portion of the DC bus 103 voltage from the current signal across resistor 124. The result is a signal nearly proportional to the inverter 105 input power if the DC bus 103 voltage variation is small.

Figure 5:
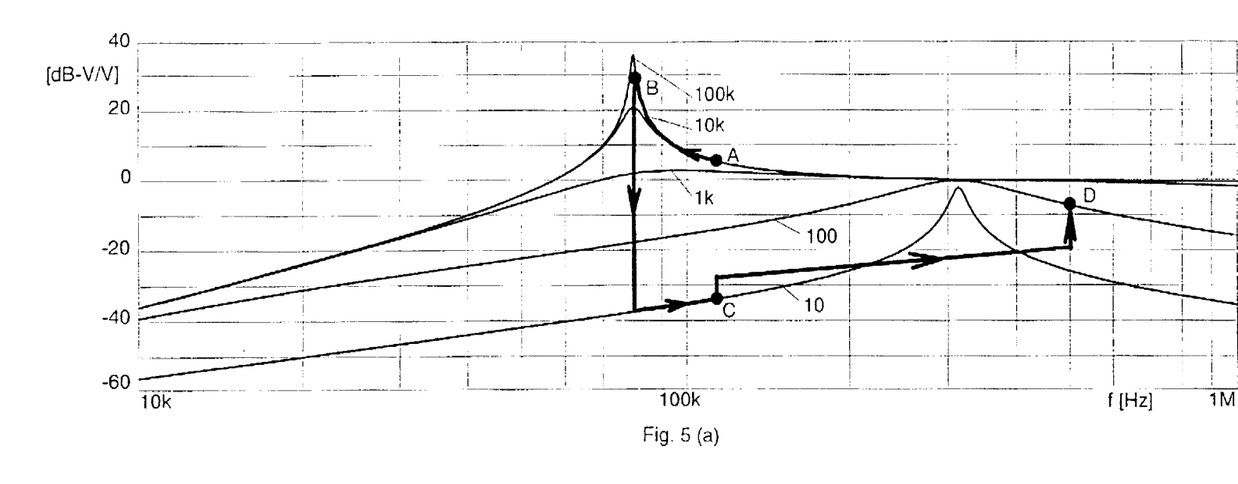

FIG. 5—DESCRIPTION, PLOT OF RESONANT NETWORK

FIG. 5(a) is a plot of the transfer function of resonant network 600 from inverter voltage output 105 to voltage across lamp 116. The frequency is displayed from 10 kHz to 1 MHz on the horizontal axis and the gain in decibels is shown on the vertical axis from −60 dB to +40 dB. A family of curves is plotted for various lamp impedances in decade steps from 10 ohms to 100 kohms, respectively. The series-resonant frequency displays a peak at a frequency of 323 kHz due to the action of series inductor 110 and series capacitors 112 and 118 in resonant network 600. This peak is predominant in the curve for 10 ohm lamp impedance representing lamp 116 during warm-up. A locus of operation is obtained by following the change in frequency and transfer function as lamp 116 goes from inactive to starting, then warming up, and finally steady-state operation. This locus is shown by the arrows on the path starting at point A which is the idle frequency of the ballast. After turning on the circuit, the frequency is decreased gradually on the path from point A to point B near the unloaded resonant frequency. At that frequency, typically 80 kHz, the resonant circuit 600 has very high gain (30 dB) and provides high voltage to start lamp 116. This high voltage causes a rapid breakdown in lamp 116 resulting in a sudden change in lamp 116 impedance from an open circuit at point B to a 10 ohm impedance. As previously described, this action is sensed by control circuit 200 of the ballast. Inverter 105 frequency is increased to a "warm-up" frequency of approximately 125 kHz at point C. After a delay time sufficient to allow lamp 116 to warm-up, the ballast raises the frequency above the series-resonant frequency to point D which is a steady-state frequency of 500 kHz. At this point, lamp 116 has warmed up and its impedance is near 100 ohms.

FIG. 5(b) is analogous to FIG. 5(a), but it is for the inverter voltage output 105 to lamp 116 current transfer function. The curves represent the transfer function for various lamp 116 impedances from 100 kohms to 10 ohms. The horizontal axis has the same frequency calibration as the previous FIG. 5(a) and the vertical axis is from −120 dB to −20 dB. The "idle" point A is the starting point of the locus and current begins to flow in lamp 116 as it moves from point B to point C. The current during "warm-up" is shown at point C, and the "steady-state" current at point D. The peak slightly left from point B, at 80 kHz represents the unloaded resonant frequency of resonant network 600 and the peak to the left of point D at 323 kHz represents the loaded resonant frequency of resonant network 600.

Figure 6:
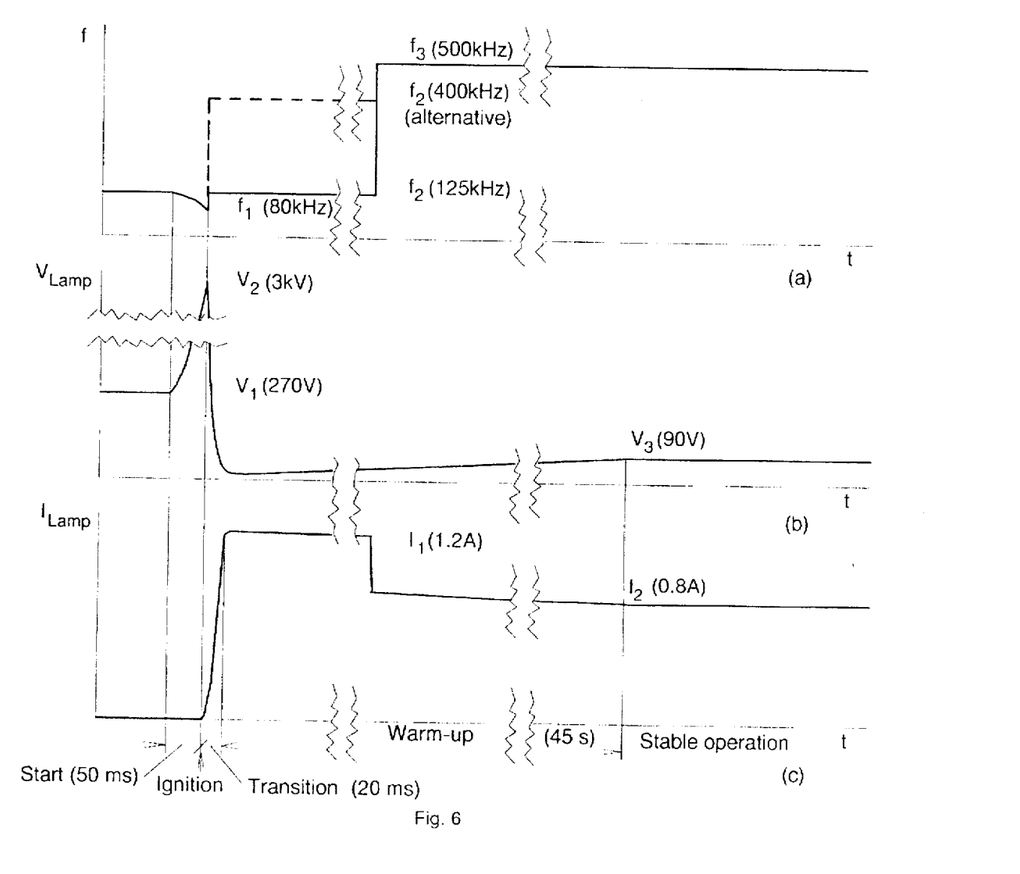
FIGS. 6a–c is a timing diagram showing the variation in frequency, lamp voltage and lamp current during the starting, ignition, transition, warm-up, and stable operation of the lamp and ballast of FIG. 1.

FIG. 6—DESCRIPTION OF TIMING

FIG. 6 is a timing diagram. FIG. 6(a) shows inverter 105 frequency, FIG. 6(b) shows lamp 116 voltage, and FIG. 6(c) shows lamp 116 current during several states of lamp 116 and ballast operation. Specifically, ballast start is at the left of FIG. 6. Lamp 116 states are ignition, transition from glow to arc, warm-up, and finally steady-state. Referring to the frequency curve in FIG. 6(a), after power is turned on, the ballast operates at an idle frequency of 125 kHz. During the starting interval the frequency decreases to a value near unloaded resonance frequency of network 600 of 80 kHz. This causes the voltage across lamp 116 to increase rapidly as shown by the voltage curve FIG. 6(b). When lamp 116 ignites, its current rises rapidly during the "transition" interval shown on the current curve FIG. 6(c). After starting, inverter 105 frequency is increased to a value, which is slightly higher than one-third of the loaded resonant frequency or to a frequency above the series-resonant frequency. Either of these values may be used for rapid warm-up of lamp 116, and both frequencies allow soft-switching operation of inverter 105. Lamp 116 current is increased to a value about 50% higher than the steady-state current. The inverter frequency is increased to a value of 500 kHz during or after warm-up. This is the result of time-out action in control circuit 100. During the warm-up time, the temperature and pressure of lamp 116 are increasing which results in lamp 116 voltage gradually rising from a value of approximately 17 volts to a final value of 90 volts. As lamp 116 warms up, the current gradually decreases.

Figure 7:
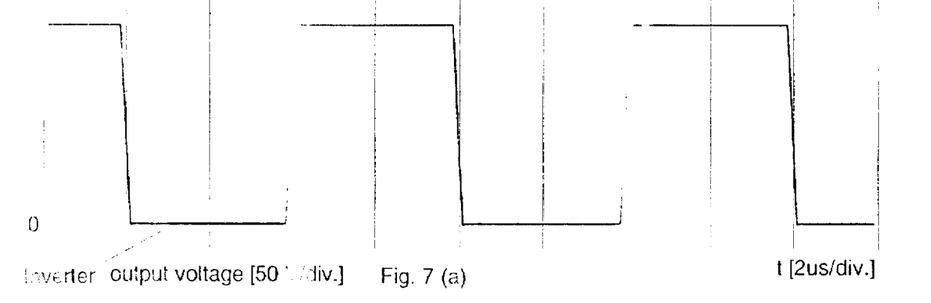
FIGS. 7a–d shows various voltage and current waveforms at the inverter output and at the lamp for the invention of FIG. 1 during the idle and starting state of operation.

FIG. 7—DESCRIPTION, WAVEFORMS

FIG. 7 shows the various waveforms of operation at inverter output 109 and at lamp 116. The voltage FIG. 7(a) and current FIG. 7(b) represent conditions during the idle period when the ballast is first turned on and the frequency is 125 kHz. The bridge output voltage plot shows nearly a square-wave with relatively slow transitions due to soft-switching. In FIG. 7(b) the inverter output 109 current is a triangle-wave and the unignited lamp 116 voltage is a round-topped square-wave. FIG. 7(b) shows that the inverter output 109 current is positive during turn-on of lower bridge transistor 108, which is a necessary condition for sole-switching.

During starting, the frequency is decreased as shown in FIG. 7(c) where inverter output 109 voltage is again a square-wave. FIG. 7(d) shows very high lamp 116 voltage generated by the unloaded resonance of the resonant network 600 at this frequency of 80 kHz inverter output 109 current lags the inverter output 109 voltage, and is positive when the top transistor 106 of the inverter 105 is turned off, a necessary condition for soft-switching.

Figure 8:
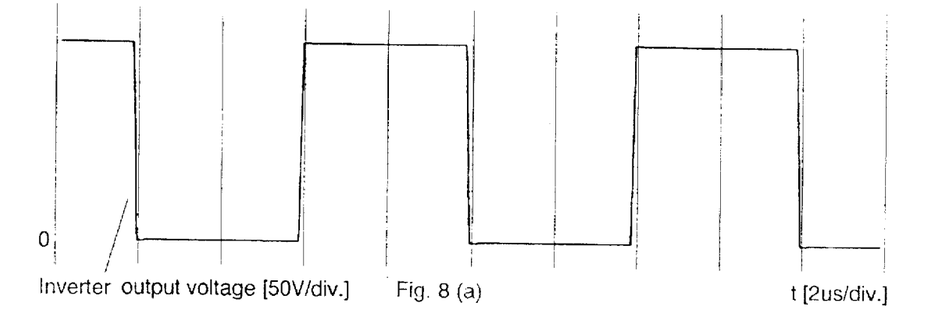
FIGS. 8a–d shows various voltage and current waveforms at the inverter output and at the lamp for the invention of FIG. 1 during the warm-up and stable state of operation.

FIG. 8—DESCRIPTION, WAVEFORMS

FIG. 8 provides similar plots of inverter 109 output voltage and inverter 109 output current during warm-up and stable operation. Inverter 109 output voltage during warm-up is shown in FIG. 8(a). The inverter 109 output current shown in FIG. 8(b) has a shape which again satisfies soft-switching conditions in the circuit at this frequency. The high frequency operation at 500 kHz is shown in FIG. 8(c) for the inverter 109 output current. The plots in FIG. 7 and FIG. 8 show that soft-switching, high-efficiency, and low-loss operation is maintained for all states of operation of the ballast.

SUMMARY, RAMIFICATIONS, AND SCOPE

Accordingly, the reader will see that we have provided a high efficiency electronic ballast which starts and operates metal halide and various other high intensity gas discharge lamps. The ballast reduces the number of power processing transistors which results in increased reliability and efficiency. In addition, it has universal lamp type and power source to compatibility and provides universal operation from different power lines and for various lamps. Furthermore, the high efficiency electronic ballast has the additional advantages in that It provides an electronic ballast at low cost;

It is a ballast which is small and lightweight;

It is a ballast which prevents acoustic arc resonance in the lamp;

It is a ballast which has a high open circuit voltage;

It is a ballast which has a high power factor;

It is a ballast which reduces the possibility of electric shock;

It is a ballast which controls lamp power simply;

It is a ballast which is protected from power or wiring faults;

It is a ballast which provides hot-restart in a low cost, compact form.

Although the description above contains many specifics, these should not be construed as limiting the scope of the invention but as merely providing illustrations of some of the presently preferred embodiments of this invention. For instance, controller 100, which has been shown as implemented with simple analog circuit techniques could be replaced with digital circuitry such as a microcontroller with inputs from self-contained analog-to-digital converters or comparators and outputs for generating inverter drive frequencies digitally.

Another variation on the invention is the use of a full-bridge inverter and a hot restrike pulse starter using two symmetrical opposed series inductors to operate multi-kilowatt lamps requiring extremely high starting voltages.

Thus the scope of the invention should be determined by the appended claims and their legal equivalents, rather than by the examples given.

We claim:

1. An electronic ballast for connection between a source of direct current power and a gas discharge lamp, comprising:

an inverter connectable to said source of direct current power for generating an alternating voltage at a variable frequency;

a capacitor having a first and a second terminal, and a network having an input port and an output port and comprising substantially inductive components;

said inverter including first and second output terminals; said input port of said network having a first and a second terminal;

said first terminal of said capacitor connected to said first output terminal of said inverter, said second terminal of said capacitor connected to said first terminal of said input port of said network;

said second terminal of said input port of said network connected to said second output terminal of said inverter;

said output port of said network connected to said gas discharge lamp;

said input port of said network having a first value of inductance when said output port is short circuited, and said input port of said network having a second value of inductance substantially greater than said first value of inductance when said output port is open circuited.

2. An electronic ballast for connection between a source of direct current power and a gas discharge lamp capable of operation in either a glow mode or an arc mode, comprising:

an inverter connectable to said source of direct current power for generating an alternating voltage at a variable frequency;

a capacitor having a first and a second terminal, and a network having an input port and an output port and comprising substantially inductive components;

said inverter including first and second output terminals; said input port of said network having a first and a second terminal;

said first terminal of said capacitor connected to said first output terminal of said inverter, said second terminal of said capacitor connected to said first terminal of said input port of said network;

said second terminal of said input port of said network connected to said second output terminal of said inverter;

said output port of said network connected to said gas discharge lamp;

said input port of said network having a first inductance value when said output port is short circuited, and said input port of said network having a second inductance value substantially greater than said first inductance value when said output port is open circuited;

said inverter being arranged to operate at a first frequency before said gas discharge lamp starts, said first frequency being above a second frequency equal to the resonant frequency of said second inductance value and the capacitance of said capacitor, but below a third frequency equal to the resonant frequency of said first inductance and the capacitance of said capacitor, said inverter being arranged to subsequently operate at a frequency which decreases towards said second frequency until said gas discharge lamp starts, and after said gas discharge lamp starts, said inverter being arranged to operate at a frequency which increases towards a frequency near said first frequency, at least until said gas discharge lamp changes operation from said glow mode to said arc mode, and said inverter being arranged to operate at a frequency above said third frequency after said gas discharge lamp changes operation from said glow mode to said arc mode, whereby said gas discharge lamp is started, transitions from said glow mode to said arc mode and operates in a steady state.

3. The electronic ballast of claim 1, further including control circuit means connected to said inverter, and detection means having an input and an output, said input of said detection means connected to said gas discharge lamp, said output of said detection means connected to said control circuit means, said detection means arranged to detect the status of said gas discharge lamp, said control circuit means arranged to control the frequency of said inverter as a function of said output of said detection means.

4. The electronic ballast of claim 3 wherein said detection means includes monitoring means connected to said gas discharge lamp for sensing the starting of said gas discharge lamp.

5. The electronic ballast of claim 1, further including a power converter connected between said source of direct current power and said inverter for changing the voltage applied to said inverter.

6. The electronic ballast of claim 1 further including power sensing means effective to detect the average power supplied to said inverter, and feedback circuit means responsive to said power sensing means, effective to change the frequency of said inverter, whereby the power supplied to said gas discharge lamp is maintained near a predetermined level.

7. The electronic ballast of claim 1 wherein said network comprises a first inductor having a first terminal connected to said first terminal of said input port; said first inductor having a second terminal connected to said first terminal of said output port; a second inductor having a first terminal connected to said first terminal of said input port; said second inductor having a second terminal connected to said second terminal of said input port; and said second inductor having an inductance higher than that of said first inductor.

8. The electronic ballast of claim 7 wherein said first inductor further includes a second winding, said second winding is connected to a source of pulsed voltage, said source of pulsed voltage is arranged to operate when said source of direct current power is applied, and said first winding has more turns than said second winding, whereby said first winding produces a voltage sufficient to start said gas discharge lamp.

9. The electronic ballast of claim 1 wherein said source of direct current power is a power factor corrector circuit means connected to a source of alternating current power for increasing the power factor and for reducing harmonic currents in said source of alternating current power, and for controlling said source of direct current power to said inverter.

* * * * *